United States Patent [19]

Teramachi

[11] 4,302,059
[45] Nov. 24, 1981

[54] LINEAR GUIDE SLIDE BEARING UNIT

[76] Inventor: Hiroshi Teramachi, 2-34-8, Higashi-Tamagawa, Setagaya-ku, Tokyo, Japan, 158

[21] Appl. No.: 120,279

[22] Filed: Feb. 11, 1980

[30] Foreign Application Priority Data

Feb. 14, 1979 [JP] Japan .................. 54/15910

[51] Int. Cl.$^3$ ............................................. F16C 29/06
[52] U.S. Cl. ..................................... 308/6 C; 308/6 R
[58] Field of Search .............. 308/6 C, 6 R, 6 A, 3.8, 308/3 R

[56] References Cited

U.S. PATENT DOCUMENTS

| | | | |
|---|---|---|---|
| 3,915,513 | 10/1975 | Mayer | 308/6 C |
| 3,964,802 | 6/1976 | Pitner | 308/6 C |
| 4,040,679 | 8/1979 | Teramachi | 308/6 C |
| 4,181,375 | 1/1980 | Ernst et al. | 308/6 C |

*Primary Examiner*—Lenard A. Footland

*Attorney, Agent, or Firm*—George B. Oujevolk

[57] ABSTRACT

Herein disclosed is a linear guide slide bearing unit employing a combination of a linear roller bearing body and an elongated track shaft. The linear roller bearing body has on its underside a channel of a trapezoidal shape in section and is provided with a pair of or sectionally right-angled V-grooves on inlined inner wall surfaces of said trapezoidal channel and a pair of sectionally square U-grooves on the outer wall surfaces of the bearing body in parallel relation with the V-grooves, each one of the U-grooves being interconnected with one of said V-grooves to form an endless guide track. Rollers are received in the endless guide track with the rotational axes of the rollers parallel alternately with one and the other wall of the V-grooves and are held in the guide track by a retainer which is provided with means for smoothly guiding the rollers along the guide track.

2 Claims, 7 Drawing Figures

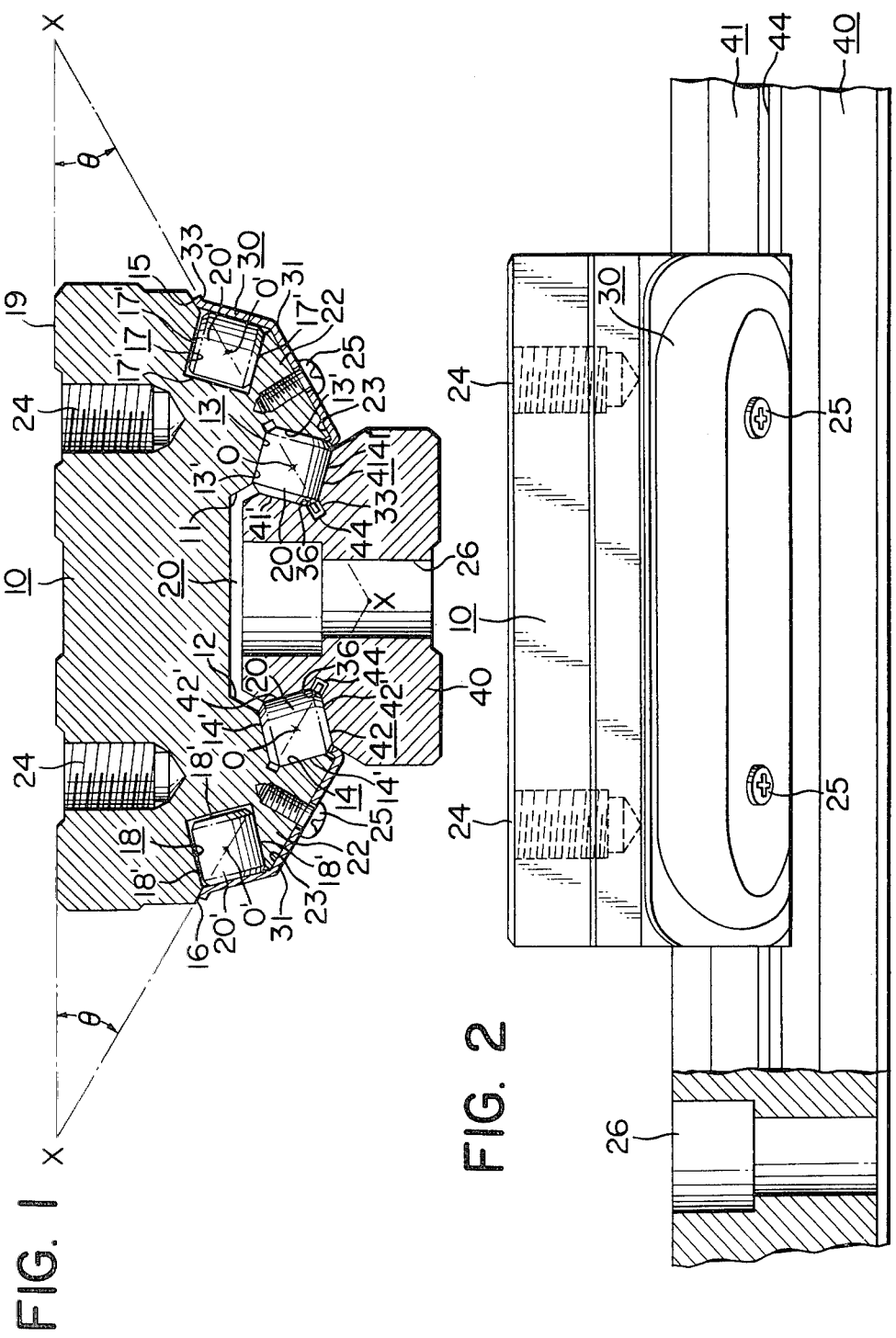

LINEAR GUIDE SLIDE BEARING UNIT

BACKGROUND OF THE INVENTION

This invention relates to a linear guide slide bearing unit for guiding a linear movement of a machine by rolling friction with a reduced resistance to movement.

More particularly, the invention concerns a linear guide slide bearing unit combining a linear roller bearing body with an elongated track shaft to develop light and rigid sliding portions.

It is known in the art to provide a slide guide employing, in combination with an elongated track shaft, a guide case (corresponding to the linear roller bearing body of the invention) which has a pair of longitudinal escape holes of square cross-section therethrough along the opposite sides thereof (Laid-Open Japanese Patent Specification No. 53-21346).

However, the formation of parallel square escape holes through the guide case requires much time and labor for turning and grinding operations and for inspection. Especially, such guide cases are unsuitable for mass production due to the difficulty of high precision machining and usually reflected by high production costs.

SUMMARY OF THE INVENTION

The present invention provides a linear guide slide bearing unit which solves the above-mentioned problems and which is easy to manufacture at a low cost and capable of providing accurate linear movements. More particularly, according to the present invention, there is provided a linear guide slide bearing unit, comprising: a bearing body having a pair of downward projections at opposite sides thereof and provided with a pair of parallel sectionally right-angled V-grooves formed on inclined load-carrying wall surfaces on the inner side of the projections and a pair of sectionally square U-grooves formed on non-load-carrying wall surfaces on the outer sides of the bearing body in parallel relation with the V-grooves; a track shaft having a pair of sectionally right-angled V-grooves at opposite sides thereof in parallelly confronting relation with the V-grooves on the bearing body; a number of rollers received in the V- and U-grooves in alternately 90° shifted positions and each having chamfered surfaces at opposite ends thereof; and retainers fixed on the projections of the bearing body, forming endless roller guide tracks in cooperation with said V-and U-grooves, each retainer having an inner edge portion engageable with the chamfered surfaces of the rollers for guiding the rollers from a load-carrying region to a non-load-carrying region along the endless track.

It is an object of the present invention to provide a linear guide slide bearing unit employing retainers for holding rollers in the U- and V-grooves on the bearing body, each retainer being substantially of trapezoidal shape in section including a flat center portion and an inclined portion formed contiguously on the outer side of the center portion to form an endless track therearound and having an elongated axial slit on the load-carrying inner side to expose the rollers therethrough without dropping same while holding the rollers in the U-grooves of the bearing body on the non-load-carrying outer side.

It is still another object of the present invention to provide a linear guide slide bearing unit of a high load capacity employing a bearing body having in load-carrying regions a channel of trapezoidal shape in section for cooperation with a track shaft of similar trapezoidal shape.

BRIEF DESCRIPTION OF THE DRAWINGS

FIG. 1 is a sectional view of a linear guide slide bearing unit according to the present invention;

FIG. 2 is a front view of the bearing unit of FIG. 1;

DESCRIPTION OF PREFERRED EMBODIMENT

Figure 3:
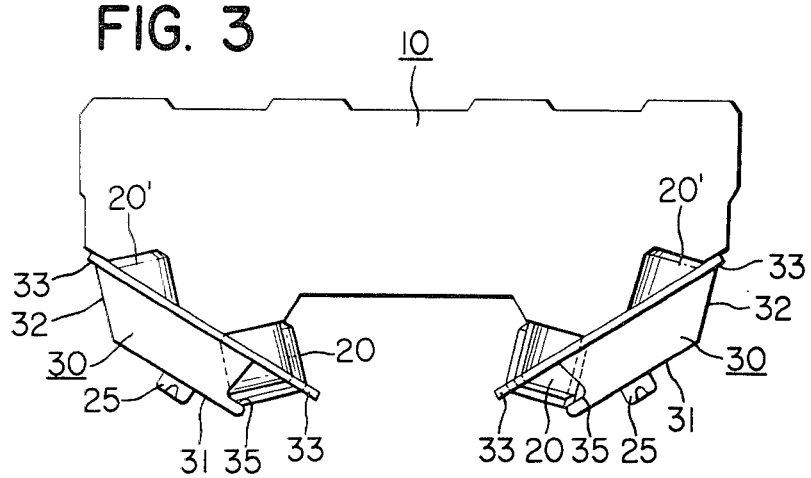
FIG. 3 is a side view of the bearing unit of FIG. 1.

Referring to the accompanying drawings which show by way of example a preferred embodiment of the present invention, designated at 10 is a bearing body proper which has on the underside a channel of trapezoidal shape in section, forming projections 22 symmetrically on opposite sides of the channel. The projections 22 are provided with sectionally right-angled V-grooves 13 and 14 on load-carrying inclined inner wall surfaces 11 and 12 and with sectionally square U-grooves 17 and 18 on non-load-carrying outer wall surfaces 15 and 16, respectively. The centers 0 and 0' of the V- and U-shaped grooves 13, 14, 17 and 18 are located on the lines X—0—0'—X which are disposed at an angle of $\theta$ with the upper mounting plane 19 of the bearing body 10 (FIG. 1).

The bearing body is provided with semi-circular R-grooves on the opposite end walls for turning the rollers 20 from the load-carrying region to the non-load carrying region.

The rollers running surfaces 13' and 14' of the V-grooves 13 and 14 which carry the loads through the rollers are finished by grinding after induction hardening.

Figure 7:
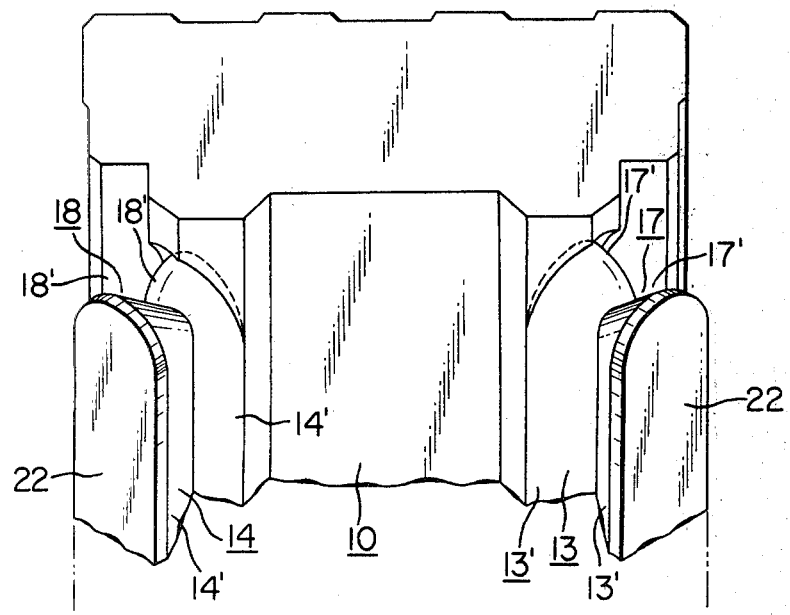
FIG. 7 is a perspective view of the bearing body.

The inclined surfaces 17' and 18' in the non-load-carrying regions are formed simply by a cutting operation using a planer or the like since the U-grooves 17 and 18 are play grooves which serve only to guide the rollers (FIGS. 1 and 7).

Figure 6:
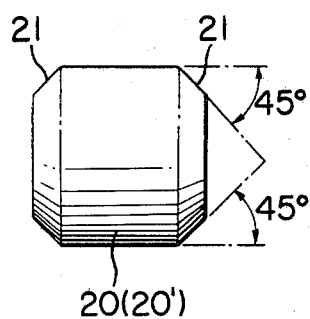
FIG. 6 is a front view of a roller.

Rollers 20 have a length L about 0.2 mm smaller than the diameter D thereof and chamfered surfaces 21 which are formed at the opposite ends at an angle of about 45° (FIG. 6).

Denoted at 30 are retainers which are press-formed to have substantially a trapezoidal shape in section integrally including a flat center portion 31, a sloped intermediate portions 32 formed contiguously around the circumference of the flat center portion 31, and a flat annular marginal portion 32 formed contiguously around the peripheral edge of the sloped portion 32, the sloped portion 32 forming an infinite or endless guide track for the rollers.

Figure 4:
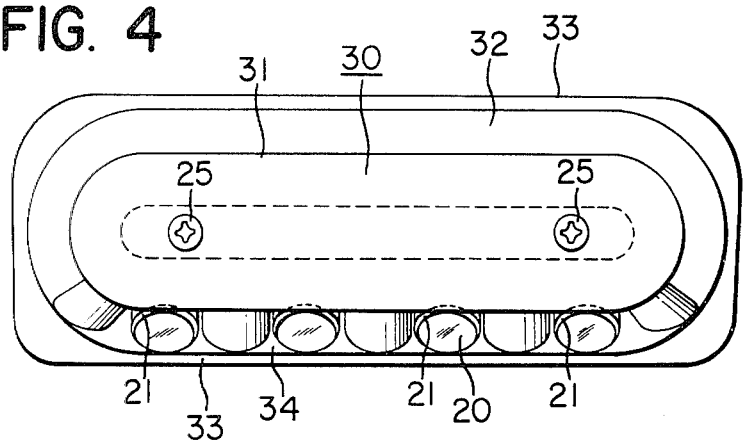
FIG. 4 is a view taken in the direction of line X—X of FIG. 1.
Figure 5:
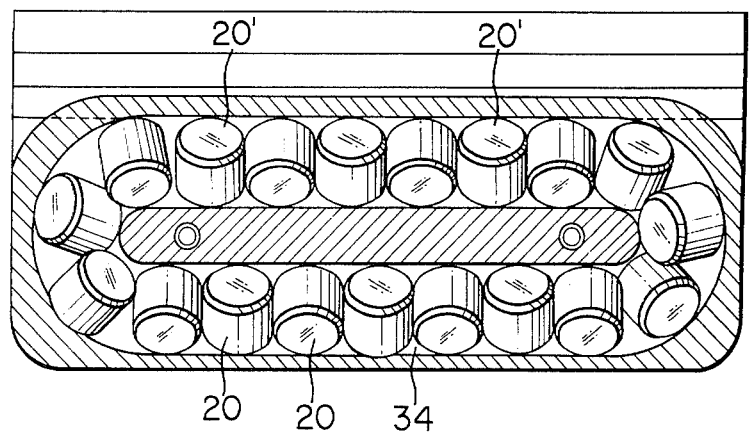
FIG. 5 is a sectional view taken on line X—X of FIG. 1.

The retainer 30 is provided with a punched, elongated slit or window 34 through which the rollers 20 are contacted with V-grooves 41 and 42 in load-carrying regions of the rail or track shaft 40. The elongated slit 34 is so dimensioned as to prevent the rollers from coming out therethrough and imparted with suitable rigidity and wear resistance by Toughtride (FIG. 4).

The flat center portion 31 of the retainer 30 has a width sunstantially same as that of the end face 23 of the projection 22 of the bearing body 10.

The flat marginal portion 33 on the side of the slit 34 has an inner edge 36 which is shaped to fit the chamfered portions 21 of the rollers 20.

The V-grooves 41 and 42 are formed at opposite sides of the rack shaft 40 opposingly and in parallel relation with the right-angled V-grooves 13 and 14 on the bearing body 10, respectively. The V-grooves 41 and 42 have the respective centers on the afore-mentioned lines X—0—0'—X (FIG. 1).

The inclined roller running surfaces 41' and 42' in the load-carrying regions of the parallel V-grooves 41 and 42 are finished by grinding after induction hardening.

The V-grooves 41 and 42 are each provided with an escape groove 44 along the inner sides of the respective bottom walls for receiving the flat marginal portions 33 of the retainer 30.

Denoted by the reference numeral 24 are internal threads for connecting the bearing body 10 to a movable or fixed structure (not shown). The retainers 30 are fixed in position on the bearing body 10 by screws 25. The track shaft 40 is provided with through-holes 26 thereby to connect the track shaft to a movable or fixed structure (not shown).

In order to fabricate the linear guide slide bearing unit of the invention as constructed above, the bearing body 10 is shaped by milling operation or formed in an elongated form by precision-drawing and cut into desired lengths, thereafter forming two V-grooves on the inner inclined wall surfaces and two U-grooves on the outer wall surfaces in parallel relation with the V-grooves.

Nextly, the V-grooves on the inclined inner wall surface and the U-grooves on the outer wall surfaces are connected by semi-circular V-grooves which are formed by R-grooving operation. The track shaft 40 with a pair of parallel V-grooves is shaped by a planer or by precision-drawing.

The retainers 30 are fabricated easily with precision by press-forming and punching operations.

It will be clear from the foregoing description that, with the linear guide slide bearing unit according to the instant invention, except the play grooves of square or U-shape on the bearing body, load-carrying V-grooves of the same dimensions are provided in pairs on the bearing body and the track shaft so that it is possible to form the V-grooves simultaneously on the bearing body and the track shaft by means of a double-head grinder.

In addition, the rollers which have the respective axes shifted alternately 90° are suitably turned along the guide track by the cooperation of the retainer and the V-grooves on the bearing body, so that there is no necessity for providing side lids for this purpose, facilitating the assembling work and contributing to the reduction of production cost.

After machining the top mounting surface of the bearing body, the roller running surfaces of the V-grooves are finished by precision-grinding using the top mounting surface as a reference or datum plane.

The positions of rollers between the bearing body and the track shaft are alternately shifted at right angles so that the rollers impose the loads alternately on the opposing roller running inclined surfaces 13' and 41' of the V-grooves 13 and 41 to carry the loads of all directions.

Since the rotational axes of the rollers are alternately shifted by 90° as hereinbefore mentioned, they receive the loads from all directions and allows reductions in the sectional height.

What is claimed is:

1. A linear guide slide bearing unit, comprising:
    a bearing body having a pair of downward projections at opposite sides thereof and provided with a pair of sectionally right-angled parallel V-grooves formed on inclined load-carrying wall surfaces on the inner side of said projections and a pair of sectionally square U-grooves formed on non-load-carrying wall surfaces on the outer side of said bearing body in parallel relation with said V-grooves;
    a track shaft having a pair of sectionally right-angled V-grooves at opposite sides thereof in parallelly confronting relation with said V-grooves on said bearing body;
    a number of rollers received in said V- and U-grooves in alternately 90° shifted positions and each having chamfered surfaces at opposite ends thereof; and
    retainers fixed on said projections of said bearing body, forming endless roller guide tracks in cooperation with said V- and U-grooves, each retainer having an inner edge portion engageable with said chamfered surfaces of said roller for guiding the rollers along said guide track from a load-carrying region to a non-load-carrying region or vice versa.

2. A linear guide slide bearing unit as defined in claim 1, wherein said projections of said bearing body form therebetween a channel of trapezoidal cross-section and said track shaft has a similar trapezoidal shape.

* * * * *